United States Patent [19]

Mercier

[11] 4,013,215

[45] Mar. 22, 1977

[54] TRASH DISPOSAL APPARATUS

[76] Inventor: Charles A. Mercier, 1009 Timber Lane, Wilmette, Ill. 60091

[22] Filed: Nov. 10, 1975

[21] Appl. No.: 630,164

[52] U.S. Cl. .................................. 232/43.1; 193/34; 232/43.5; 232/44

[51] Int. Cl.² .......................................... B65G 11/14

[58] Field of Search .................. 232/44, 43.1, 43.2, 232/43.5; 193/5, 6, 33, 34

[56] References Cited

UNITED STATES PATENTS

| | | | |
|---|---|---|---|
| 1,055,311 | 3/1913 | Blount | 193/34 |
| 2,177,328 | 10/1939 | Pender | 193/34 |
| 2,792,171 | 5/1957 | Rosset | 232/44 X |
| 2,841,351 | 7/1958 | Riepen | 248/DIG. 7 |
| 3,204,740 | 9/1965 | Legault | 232/44 X |
| 3,554,345 | 1/1971 | Mullens | 232/44 X |

*Primary Examiner*—Roy D. Frazier
*Assistant Examiner*—Peter A. Aschenbrenner
*Attorney, Agent, or Firm*—Edward R. Lowndes

[57] ABSTRACT

A residential trash disposal apparatus for conducting waste material from a kitchen area within a building and depositing the same in a receptacle exteriorly of the building. The container is provided with a cover member having a tubular sleeve projecting upwardly therefrom and which is telescopically and slidably received over the vertical discharge leg of a chute which is connected by means of a curved bend to a horizontal inlet leg of a chute which passes through the building wall and communicates with the kitchen area. By raising the cover member vertically until the upper rim of the sleeve binds against the curved juncture region between the vertical and horizontal legs, the cover member becomes frictionally locked in its raised position so that sufficient clearance is afforded for withdrawal of the container for emptying and replacement purposes.

3 Claims, 5 Drawing Figures

TRASH DISPOSAL APPARATUS

The present invention relates generally to waste disposal apparatus and has particular reference to a novel system and apparatus whereby small articles of trash, including wrapped or otherwise packaged waste foodstuff commonly referred to as garbage, may be conducted from a kitchen, pantry or other working area within a building and deposited in a ground-supported container such as a conventional garbage can disposed exteriorly of the building.

There are in existence at the present time waste disposal systems wherein trash material which is discharged through an opening in the wall of a building is conducted by means of a chute downwardly and deposited in a covered ground-supported waste container exteriorly of the building. A sleeve on the cover of the container is slidable on the vertical discharge leg of the chute so that when the cover and its associated sleeve are raised vertically, clearance is afforded to permit removal of the container for emptying and replacement purposes.

Waste disposal systems of this general character are possessed of certain limitations and, principal among these, is the lack of an effective and efficient means for maintaining the cover in its raised position so that the average person, usually a housewife, or an impatient garbage collector, may attend to the emptying procedure with both hands. The present invention is designed to overcome the above-noted limitation that is attendant upon the construction and use of such a chute and sleeve-equipped waste disposal system and, toward this end, the invention contemplates the use of a chute embodying an upper horizontal leg which projects through an opening in the wall of the building and a vertical leg exteriorly of the building, the two legs communicating with each other by means of a curved bend or juncture region. The overall height of the container including the sleeve on the cover, and the vertical extent of the vertical leg of the chute which telescopically receives the sleeve thereover, are such that when the cover is fully and manually raised and thereafter released, the upper open rim of the sleeve will frictionally bind against the curved juncture region and thus retain the cover in an elevated position and afford adequate clearance between the cover and its associated container to permit easy withdrawal of the container from beneath the cover for emptying and replacement purposes. Furthermore, the clearance thus afforded is adequate to allow the container to be tilted outwardly on its lower circular base for inspection of the contents thereof without actually withdrawing the container from beneath the raised cover, as for example in an instance where the housewife or other person desires to retrieve some object which inadvertently and recently has been discharged through the chute and into the container. This latter feature of the invention is particularly advantageous where the container is nearly filled and it would otherwise be inconvenient to lift the container entirely from its ground-supported position for sifting purposes and then replace the same.

A further limitation that is attendant upon known waste disposal systems of the general character briefly outlined above resides in the difficulty that is encountered when it is desired to deposit a foreign object such as a stray stone, a small branch, a dog or other animal dropping or the like within the container from outside the dwelling. The placement of each such object within the container necessitates raising of the cover member, holding it raised with one hand, and depositing the article in the container with the other hand. With the structure of the present invention, the housewife or other operator may initially raise the cover member to its fully raised and frictionally locked position as previously described, after which a systematic collection of foreign material in the surrounding yard area may be resorted to so that only one trip to the container is necessary instead of repeated trips back and forth with repeated manipulations of the cover member.

Yet another limitation that is attendant upon the construction and use of chute-equipped systems of the character under consideration resides in the necessity of accurately vertically centering the waste disposal container relative to the vetical discharge leg of the chute. Ordinary conventional garbage containers and their associated cover members are invariably constructed so as to present a relatively tight and sealing fit so that frequently considerable pains must be taken to force the cover or lid telescopically over the upper rim of the container. According to the present invention novel means are provided for accurately centering the container relative to the vertical leg of the chute, such means assuming the form of a circular pilot depression which is formed in a concrete or other base support for the container, such depression being conveniently established by utilizing the base of the container itself as a pattern at a time shortly after the wet concrete of the support is poured and before it has become fully hardened.

The provision of a trash disposal apparatus which is relatively simple in its construction and which therefore may be manufactured at a low cost; one which employs largely for its construction commercially available structural elements and materials, thereby further contributing to economy of manufacture; one which is comprised of a minimum number of parts, particularly moving parts and which therefore is unlikely to get out of order; one which is capable of ease of assembly and disassembly for purposes of inspection of parts, replacement or repair thereof; one which may be installed as original equipment in connection with the erection of new buildings or may be operatively applied to existing buildings; one which is rugged and durable and which therefore will withstand rough usage; one which is attractive in its appearance and pleasing in its design; and one which otherwise is well adapted to perform the services required of it, are further desirable features which have been borne in mind in the production and development of the present invention.

Other objects and advantages of the invention, not at this time enumerated, will become readily apparent as the following description ensues.

In the accompanying single sheet of drawings forming a part of this specification, one illustrative embodiment of the invention has been shown.

Figure 1:
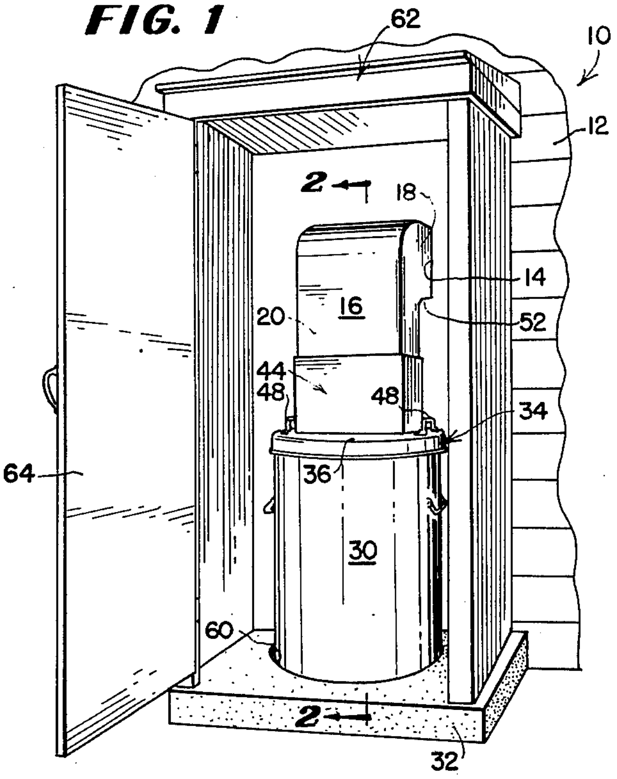
FIG. 1 is a fragmentary front perspective view of a trash disposal apparatus embodying the principles of the present invention and showing the same operatively installed in a residential building.
Figure 2:
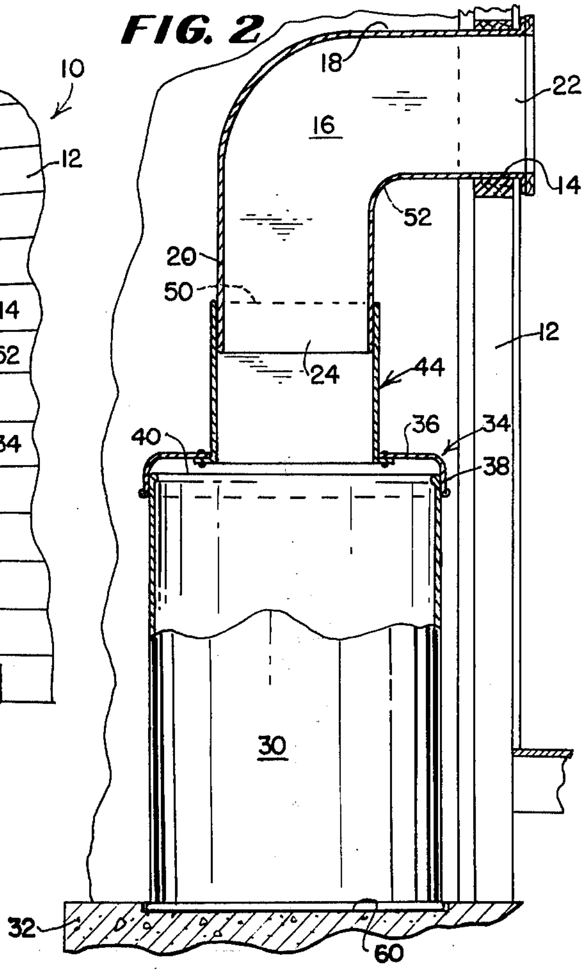
FIG. 2 is an enlarged vertical sectional view taken substantially on the line 2—2 of FIG. 1 in the direction of the arrows.

Referring now to the drawings in detail, and in particular to FIGS. 1 and 2, the trash disposal apparatus of the present invention is designated in its entirety by the reference numeral 10 and it is shown as being operatively installed in association with one wall 12 of a building which, for purposes of discussion herein, may be regarded as an inhabitable dwelling having an area such as a kitchen with which the wall 12 is associated.

The wall 12 is formed with an opening 14 therein, the opening being preferably, but not necessarily, of rectangular configuration and of such size that small articles of trash including packaged amount of food refuse, commonly referred to as garbage, and other discard material may be discharged through the opening 14. Wherever practical, the opening 14 will be located immediately above, or alongside a countertop and preferably in the vicinity of the kitchen sink. Irrespective however of the particular location of the opening 14, the essential features of the invention remain substantially the same.

The opening 14 has associated therewith a trash delivery chute 16 which is generally of inverted L-shape design and including an upper horizontal leg 18 and a vertical leg 20. The upper leg 18 projects through the opening 14 and establishes a rectangular inlet opening 22 for reception of refuse material, while the lower end of the vertical leg 20 establishes a rectangular outlet opening 24 for discharge of such refuse material exteriorly of the building and from the chute 16. A container 30 in the form of a conventional garbage can, and which is adapted to receive the refuse material from the chute 16, is positioned directly beneath the vertical leg 20 (see also FIG. 3) in vertical register therewith and is spaced an appreciable distance therebelow for purposes that will be made clear presently. A concrete block or other support 32 may be provided on the ground surface alongside the building for supporting the container 30. If desired, the wall opening 14 may have associated therewith a conventional hinged closure door, a sliding panel or the like (not shown) so as to prevent unwanted odors, as well as cold air during inclement weather, from entering the kitchen.

Figure 3:
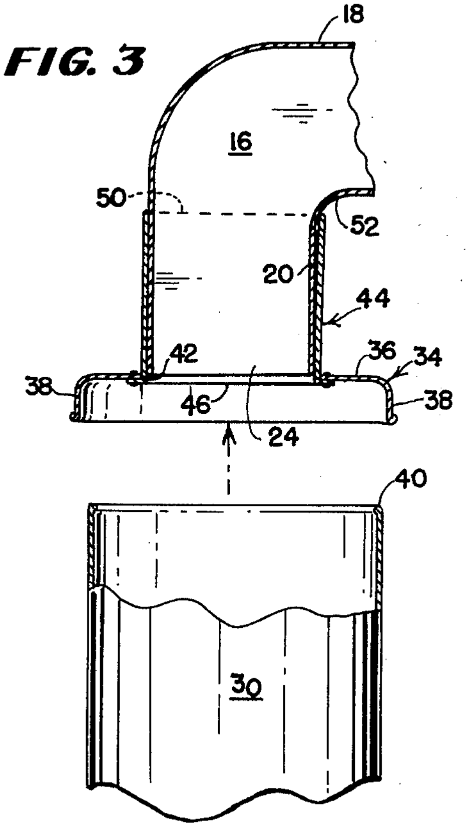
FIG. 3 is a fragmentary exploded sectional view taken centrally and vertically through a trash container, its associated cover member and an adjacent portion of an associated trash chute, the cover member being shown in its fully raised frictionally locked position, so as to release the trash container for removal purposes.
Figure 4:
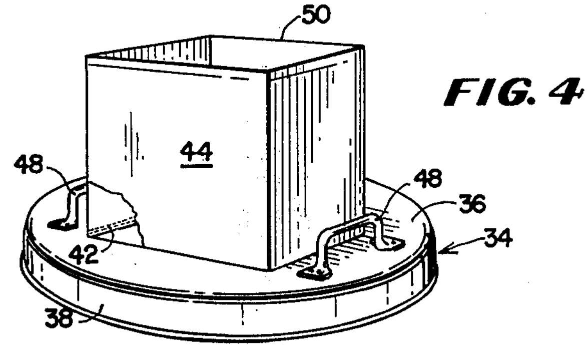
FIG. 4 is a further enlarged top perspective view of the vertically shiftable cover member showing the same in its free or detached condition.
Figure 5:
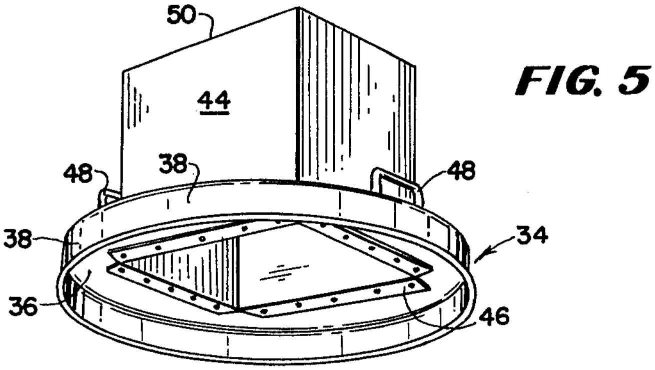
FIG. 5 is a bottom perspective view of the cover member shown in FIG. 4.

Referring now additionally to FIGS. 3 to 5 inclusive, the container 30 is provided with the usual cover member 34 which, in the illustrated form of the invention, is of circular design and includes a substantially flat disk 36 having a depending peripheral flange or apron 38, the latter being designed for telescopic reception over the upper open circular beaded rim 30 of the container 30 as shown in FIG. 2.

As best shown in FIG. 4, the cover member 34 is provided with a central rectangular opening 42 from which there projects vertically upwardly an open-ended rectangular tubular sleeve 44. The lower rim of the sleeve 40 is sealingly secured to the rim of the opening 42 in any suitable manner, as for example by means of lateral rim flanges 46 (FIG. 5) which are riveted, soldered or otherwise secured to the underneath or inner side of the cover member 34. A pair of lift handles 48 are provided on the upper or outer side of the cover on opposite sides of the sleeve 40.

The tubular sleeve 44 is designed for sliding telescopic reception over the vertical leg 20 of the chute 16 between the lowered position in which it is shown in FIGS. 1 and 2 wherein the cover member is effectively seated upon the open rim of the container 30, and the raised position in which it is shown in FIG. 3 wherein the extreme upper rectangular rim 50 of the sleeve 44 engages and frictionally binds against the curved bend or elbow-like juncture region 52 between the vertical leg 20 and the horizontal leg 18 of the chute 16. The overall height of the container 30, the extent of the sleeve 44, and the extent of the vertical leg 20 are such that when the cover member 34 is in its fully raised position, the cover member is appreciably raised above the level of the upper open rim 40 of the container, thus afforing ample clearance space so that the container may be withdrawn from beneath the cover member for purposes of emptying and replacing the same, the cover 34 remaining raised due to the previously mentioned binding action at the juncture region 52.

It is to be noted at this point that the telescopic fit between the sleeve 44 and the vertical leg 20 of the chute 16 is a relatively loose fit, the proportions being such that not only is it a comparatively easy matter for an operator such as a housewife to slide the sleeve onto such leg if any time it is found necessary to do so, but additionally, the looseness of the fit is such that there is little or no frictional resistance to vertical sliding movement of the sleeve on the leg. Thus, if the cover 34 is manually raised from the container an insufficient distance for the upper rim 50 of the sleeve to bind against the juncture region 52 and then released, the cover and sleeve will fall by gravity to its container-closing position. Stated otherwise, it is only when the sleeve 44 frictionally binds against such juncture region that the cover is self-sustaining. This binding of the cover assembly against the juncture region 52 constitutes one of the principal features of the present invention.

Referring again to FIGS. 1 and 2, another feature of the invention resides in the provision of a shallow circular depression 60 which is formed in the concrete block on which the container 30 is seated. The diameter of such depression is only slightly greater than the diameter of the base of the container and the depression is substantially coincident with the central vertical axis of the vertical leg 20 of the chute 16. Thus, when the container is properly seated within the depression 60, proper registry of the cover 34 with the container 30 is assured when the former becomes lowered upon the latter.

It is to be noted at this point that the herein described trash disposal apparatus is comprised in the main, of commercially available components or materials and is therefore capable of being manufactured and installed at a relatively low cost. The trash container 30 may be in the form of a conventional garbage can, together with its cover or lid which is readily obtainable from a hardware store or, in quantity, from a hardware supply establishment. The chute 16 may be in the form of a similarly available one-piece galvanized sheet metal elbow. The slidable cover assembly may readily be fashioned by cutting the rectangular opening in the central portion of the cover and thereafter constructing the rectangular sleeve from sheet metal stock, flanging the lower rim thereof and riveting, soldering or otherwise fastening the flanges in position around the perimeter of the opening, such operations requiring no special degree of skill on the part of a sheet metal workman or an amateur householder. The carpentry work involved in creating the wall opening 14 and applying a suitable closure door or panel thereto is also within the skill of an ordinary carpenter or of the householder himself. The apparatus is therefore readily capable of installation as original equipment in newly erected dwellings or it may be applied to existing buildings.

From the above description it is believed that the nature and operation of the trash disposal system will be readily apparent without further detailed description. It is worthy of note however that the relatively short horizontal extent of the upper horizontal leg 18 of the chute 16 is such that small articles or trash fragments which are flung through the inlet opening 22 will ordinarily be carried forwardly to such an extent that they will register with the vertical leg 20 and thus fall by gravity through such leg and also through the sleeve 44 and enter the container 30. Larger or heavier articles, trash bundles or the like may, if necessary, be dropped into the vertical leg 20 directly since only a very small reach is required after such articles have been manually introduced through the opening 22. It is also noted that, when it is desired to place trash into the container 30 from outside the dwelling, the cover 34 may be raised a slight distance from the rim of the container 30 and, while holding the cover thus elevated with one hand, a small trash item may be passed beneath the cover and thus deposited within the container, after release of the cover will serve automatically to restore the same to its position of closure on the container. Larger trash items may require the cover 34 to be raised to such an extent that the sleeve 44 binds against the juncture region 52 as previously set forth and is thus maintained raised while the trash is inserted manually into the container. Finally, since the cover 34 is maintained in a stable condition on the container 30 by reason of both the container apron 38 and the axially fixed sleeve 44, the container is not subject to overturning either under the influence of wind conditions or scavenging animals such as dogs or squirrels.

As a further adjunct to the present invention, if desired, the portions of the trash disposal apparatus exteriorly of the building may be enclosed within a protective shed structure 62 having a hinged access door 64 associated therewith.

The invention is not to be limited to the exact arrangement of parts shown in the accompanying drawings or described in this specification as various changes in the details of construction may be resorted to without departing from the spirit of the invention. For example, although in the illustrated form of the invention the chute 16 is provided with a right angle bend therein, under certain circumstances, as for example where it is desired that the container 30 be further removed from the building, the chute may be formed of multiple sections, telescopically fitted together and including a steeply inclined medial section. Furthermore, it is contemplated that the cross sectional shape of the chute 10 may be circular instead of rectangular, in which case the opening in the cover 34 will also be circular. Additionally, although the upper leg 18 of the delivery chute 16 is disclosed herein as being horizontally positioned, it is within the purview of the invention to form the chute so that the leg 18 projects outwardly of the opening 10 on an incline, the only requisite being that such leg shall have an appropriate horizontal component of direction and that it establishes a curved juncture region with the vertical leg 20. Thus, it is intended that the term "substantially horizontal" as used herein shall be construed so as to include a reasonable degree of incline if desired. Therefore, only insofar as the invention has particularly been pointed out in the accompanying claims is the same to be limited.

Having thus described my invention, what I claim and desire to secure by letters patent is:

1. A trash disposal apparatus for conducting small articles from a kitchen area within a residential building through an opening which is formed in the kitchen wall to a discharge area exteriorly of the building in relatively close proximity to the latter and below the level of such opening, said apparatus comprising a substantially cylindrical trash container having an open upper circular rim and disposed in an upright position in said discharge area, a circular disk-like cover for said container and provided with a depending peripheral apron-like flange adapted to encompass said upper rim of the container when the cover is in its operative position of closure on the container, said cover being formed with a central opening therein, a tubular sleeve fixedly secured to the cover and projecting vertically upwardly from said opening, an open-ended trash delivery chute of generally inverted L-shaped configuration and including an upper leg having a horizontal directional component and a vertical leg, a curved elbow-like juncture region establishing communication between said legs, the distal lateral end of said upper leg being adapted for reception within said wall opening and establishing a trash inlet, the lower end of said vertical leg establishing a trash discharge outlet, said sleeve being telescopically and loosely slidable on said vertical leg between a lowered position wherein the cover seats in its operative position of closure on the container, and a fully raised position wherein the upper open rim of the sleeve frictionally engages and binds against said curved elbow-like juncture region, thus maintaining the cover in a raised position vertically spaced from the container to afford access to the interior of the latter, as well as to permit withdrawal of the container from said discharge area for emptying and replacement thereof, the frictional engagement between the upper rim of the sleeve and the curved juncture region constituting the sole supporting means for maintaining the cover in its fully raised position.

2. A trash disposal apparatus as set forth in claim 1, wherein said chute and sleeve are of rectangular cross section throughout their effective extent.

3. A trash disposal apparatus as set forth in claim 1, wherein a pair of bail-like lifting handles are secured to the upper side of the cover in the peripheral region thereof and on opposite sides of said sleeve, a ground-supported block-like concrete platform is disposed in said discharge area for receiving the container thereon, and a shallow circular pilot depression is formed in the upper surface of said platform for maintaining the container coaxial with said vertical leg.

* * * * *